2,877,208

ACRYLATE MONOMERS AND POLYMERS OF TETRAHYDROPYRAN METHYL ALCOHOL

Joginder Lal, Drexel Hill, Pa., assignor to H. D. Justi & Son, Inc., Philadelphia, Pa., a corporation of Pennsylvania No Drawing. Application June 8, 1956
Serial No. 590,087

15 Claims. (Cl. 260—45.5)

This invention relates to novel compounds and to synthetic resins readily prepared from such novel compounds which are particularly suitable in the formation of shaped hard, transparent, solid materials of noteworthy value in the fields of optics, dentistry and prosthetic devices.

It has been found that novel acrylate esters of tetrahydropyran-2-methanol, prepared by reacting said tetrahydropyran-2-methanol with an acrylic acid such as acrylic acid, alpha methyl acrylic acid or alpha chloro acrylic acid, are valuable polymerizable compounds which can be easily converted into desirable, transparent, solid, resinous polymers under the influence of heat, light or radiation, free radical polymerization catalysts, such as persulfate or peroxide catalysts, etc.

The new compounds can be beneficially copolymerized with other polymerizable monomers to impart to the resinous product controlled physical properties of hardness, insolubility in or resistance to common organic solvents and improved adhesion to ceramic, metal, tooth enamel and plastic surfaces while minimizing objectionable volumetric shrinkage occurring during the polymerization to the solid condition.

In contrast to the thermoplastic, heat-sensitive and organic solvent susceptible characteristics of the usual acrylate or methacrylate polymers, such as polymethyl methacrylate, it is surprising that polymers of the esters of tetrahydropyran-2-methanol and an acrylic acid are infusible and rather insensitive to heat, insoluble in common organic solvents, and have properties which are typical of cross-linked polymers.

It is possible that the tertiary hydrogen atom at the 2 carbon position of the tetrahydropyran ring of the polymerizable ester acts as a site for chain transfer and acts as a chain propagation point under the influence of a free radical polymerization catalyst. This property of the above mentioned tertiary hydrogen atom in the presence of the reactive polymerizable $CH_2=C<$ group may explain the formation of a cross-linked or three dimensional network.

Although I do not desire to be bound by any such explanation, it is, nevertheless, significant that the new polymers and new copolymers containing a polymerized acrylic ester of tetrahydropyran-2-methanol exhibit such physical properties as infusibility and resistance to strong organic solvents such as acetone. These properties clearly indicate that the mechanism of polymerization is chemically and physically different and distinct from the usual linear acrylic polymerization in which a single polymerizable group, $CH_2=C<$, constitutes the reactive moiety.

A significant advantage of the novel polymerizable compounds of the invention, is their ability to render infusible and insoluble other polymerizable monomers, particularly acrylic monomers which are ordinarily fusible and soluble in organic solvents.

The amount of the tetrahydropyran-2-yl acrylate which brings about said characteristic change in the properties of the inter polymerized copolymerized or graft polymerized product may be quite small. For example: with methyl methacrylate, a typical acrylic monomer, or with styrene, a typical vinyl polymer, about 10% of tetrahydropyran-2-yl-methyl methacrylate alters said acrylic or vinyl monomer from a soluble, fusible condition, to one which is insoluble and infusible. A significant decrease in volumetric contraction of such mixtures during polymerization is noted, as compared with the volumetric shrinkage during polymerization of the unmodified, unmixed, starting vinyl or acrylic monomer.

Improved compatibility in the mixture of monomers as well as in polymer-monomer slurries is obtained with the addition of the liquid monomer of the invention. Even with mixed monomers or polymers in incompatible combination the addition of the liquid tetrahydropyran-2-methyl acrylate compound makes them compatible.

For example: in the presence of the compounds of the invention cyclohexyl methacrylate monomer and methyl methacrylate polymer are quickly polymerized to provide a dense, non-porous tripolymer polymer, whereas in the absence of these compounds, the ingredients mix more slowly, are not completely compatible, polymerize more slowly and result in products of poorer density, greater porosity and poorer physical characteristics; using a mixture of butyl or hexyl methacrylate monomer with methyl methacrylate polymer, no polymerization occurs, even though a quick setting polymerization system of benzoyl peroxide and aromatic amine-triggering agent such as N,N-dimethyl p-toluidine is employed as in the foregoing case. The addition of about 5–100% of the compound of the invention in the monomer phase to the mixture of butyl methacrylate monomer and methyl methacrylate polymer brings about rapid polymerization in from about 5 to 30 minutes to produce superior resinous products. More rapid dispersion of the methyl methacrylate polymer, in bead form, in said mixture is noted. Also the dispersion of bead polymer in monomer phase is more uniform and more complete when the acrylate of the invention is added.

The polymers which can be utilized in slurry polymerizations may be from other esters of acrylic acid, such as, for example, the polymers extending from methyl to stearyl acrylate, or methacrylate polymers or chloroacrylate polymer or substituted polymeric styrenes, or polymeric vinyl benzoates, or polymeric higher esters of itaconic acid.

For dental purposes highly desirable copolymers which may be employed, include:

(1) The copolymer of methyl methacrylate (50 parts) styrene (47 parts) and methacrylic acid (3 parts);

(2) Copolymer of methyl methacrylate (82 parts), butyl acrylate (15 parts) and methacrylic acid (3 parts);

(3) Copolymer of methylmethacrylate (67 parts), styrene (15 parts) acrylonitrile (15 parts) and methacrylic acid (3 parts);

(4) Copolymer of methyl methacrylate (70 parts), and acrylonitrile (30 parts); and (5) Where softer products are desired, copolymers containing ethyl methacrylate 50 parts and 50 parts of either (a) N-butyl methacrylate or (b) methyl methacrylate.

Improved dispersibility of the usual pigments employed in dental work, such as titanium dioxide, iron oxide, chrome yellow, etc., or of filler materials, glass fibers, feldspars and the like is obtained because of the compatibilizing action of the tetrahydropyran-2-yl-methyl ester monomer compounds of the invention on the methacrylate polymer in the monomer-polymer slurries containing such pigments.

The presence in copolymers of quite small amounts (0.1–5%) of methacrylic or acrylic acid improves the above mentioned dispersibility and also enhances the adhesive qualities of the slurry.

Acrylonitrile in the copolymer of monomer-polymer slurries imparts better compressive strength, better water resistance and improved abrasion resistance to the products used for dental and other purposes.

A great improvement in adhesion is exhibited by slurries containing the present product with respect to ceramic, metal, plastic and tooth surfaces, which provides an important further advantage of the product of the invention.

Dental products containing the polymerized compound of the present invention may be softened by non-toxic plasticizers in appropriate amounts. Chemical plasticizers such as the ester plasticizers, dibutyl phthalate, dioctyl phthalate, dibutyl sebacate or the Paraplex resinous alkyd plasticizers such as ethylene glycol sebacate, etc., soften and render flexible the transparent products produced for use under widely varying temperature conditions. Alkyl phthalyl alkyl glycollates, each alkyl group having 1–5 carbon atoms, are suitable plasticizers. Other such non-toxic plasticizers such as methyl abietate, castor oil, etc., can be also used. Combinations of plasticizer may be used depending on the nature of the plasticizers in combination and the degree of softness or hardness desired.

Plasticizers are generally used in amounts such that the total plasticizer content is about 5–30 weight percent, and preferably about 10–20 percent.

An object of the invention is to provide new acrylate compounds and polymers containing a compound of the formula

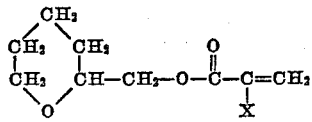

Where X is halogen, chlorine preferably, or lower normal alkyl (preferably methyl to butyl), or hydrogen.

A further object of the invention relates to new and improved polymerizable synthetic resin forming compounds and, more particularly, to the polymerizable methacrylic ester of tetrahydropyran-2-methanol.

Another object of the invention is to provide polymers of the said ester and to provide copolymers of the said ester with polymerizable vinyl or acrylic compounds, more specifically, to provide copolymers of the said ester with polymerizable acrylic monomers.

Other and further objects of the present invention will appear from the more detailed description set forth below, it being understood that such more detailed description is given by way of illustration and explanation only and not by way of limitation, since various changes therein may be made by those skilled in the art without departing from the scope and spirit of the present invention.

Polymerization may be brought about in bulk, in the presence of a solvent or in suspension. Polymerization of the monomer may also be brought about in the presence of a polymer either thermally or by an oxidation-reduction system at a lower temperature, usually 20–37° C.

The following specific examples are furnished to illustrate the methods of preparing the new compositions of matter but it will be understood that the invention is not limited to the details therein given.

*Example 1*

116 grams (1 mole) of tetrahydropyran-2-methanol were mixed in a suitable flask with 95 grams (1.1 moles) of glacial methacrylic acid and 200 ml. of benzene. 3 grams of p-toluene-sulfonic acid was added as catalyst; 3 grams of hydroquinone and 3 grams of di-β-naphthyl-p-phenylenediamine were added to the flask to inhibit polymerization. The flask was connected to a phase separator (trap) and a reflux condenser. The contents of the flask were gently refluxed and 18.3 ml. of water were removed from the phase separator. The solvent and excess methacrylic acid were then removed by distillation under reduced pressure using a Claisen distillation head. The residual liquid in the distillation flask was distilled under a vacuum to yield 147 grams of colorless liquid boiling at 93° C. at 2.7 mm. pressure.

The distillate was freed from traces of methacrylic acid and hydroquinone by washing with dilute solution of sodium hydroxide and then with water. It was dried over anhydrous sodium sulfate. 1 gram of di-β-naphthyl-p-phenylenediamine was added to the filtered dried material and pure product obtained by fractional distillation through a column under vacuum. It had a refractive index of 1.4598 at 25° C., a density of 1.0268 at 25° C. and a saponification number of 183 (theoretical 184).

*Example 2*

A mixture of 116 grams (1 mole) of tetrahydropyran-2-methanol, 250 grams (2.5 moles) of methyl methacrylate, 3 grams of p-toluene sulfonic acid, 3 grams of hydroquinone and 3 grams of di-β-naphthyl-p-phenylenediamine was placed in a 1-litre flask and connected to a one-meter column packed with glass helices. The mixture was gently refluxed and an azeotrope of methanol and methyl methacrylate boiling at 64.2° C. was removed periodically until no more azeotrope came over. The product was distilled as in Example 1 to give 140 grams of a colorless liquid which was then purified as described earlier.

*Example 3*

Two grams of tetrahydropyran-2-yl-methyl methacrylate was heated in the presence of 0.1 percent of benzoyl peroxide in a sealed test tube immersed in water at 60° C. After 24 hours, the tube was kept for 72 hours at 120° C. in an oven. After cooling, the tube was broken and a clear colorless bubble free polymerized mass was obtained. The polymerized material was hard and brittle and insoluble in acetone, ethylene dichloride, nitromethane, dioxane and dimethyl formamide. The polymer had a density of 1.16 at 25° C.

*Example 4*

The following compositions were copolymerized as in Example 3 to give clear, colorless materials whose resistance to solvent action of acetone is given below. The solvent resistance was determined by suspending 0.5 gram of the copolymer in 100 ml. of acetone for 48 hours, the contents being shaken occasionally.

| Monomer Composition | Solubility Characteristics of the Copolymer |
| --- | --- |
| 1. THPM 10%, MM 90% | Slightly Soluble in acetone. |
| 2. THPM 20%, MM 80% | Insoluble in acetone. |
| 3. THPM 30%, MM 70% | Do. |
| 4. THPM 10%, Sty. 90% | Slightly Soluble in acetone. |
| 5. THPM 20%, Sty. 80% | Insoluble in acetone. |
| 6. THPM 30%, Sty. 70% | Do. |

THPM means tetrahydropyran-2-yl methyl methacrylate.
MM means methyl methacrylate.
Sty. means styrene.

*Example 5*

In a 2-litre suspension polymerization kettle, a mixture of 30 grams of tetrahydropyran-2-yl-methyl methacrylate and 270 grams of methyl methacrylate containing 3 grams of benzoyl peroxide dissolved in it was added to 900 ml. of water containing 4 grams of soluble starch. The contents were vigorously stirred with a stirrer revolving at 1200 R. P. M. Polymerization was carried out at 70–75° C. in an atmosphere of nitrogen for about 6 hours. After cooling, the fine pearl copolymer was filtered and washed thoroughly in water. The dried copolymer weighed 215 grams.

Example 6

Two grams of the copolymer in Example 5 were thoroughly mixed with 40 milligrams of benzoyl peroxide. It was then treated with 1 ml. of methyl methacrylate containing 0.5 percent by weight of N,N-dimethyl-p-toluidine. The resulting adhesive slurry or dough polymerized in about 8 minutes to a hard mass with tremendous evolution of heat.

Example 7

The adhesive slurry obtained in Example 6 was applied in a thin layer to parallel faces of two steel rods. After the slurry had polymerized to a hard mass, the two steel rods were found to be very firmly joined and could not be separated.

Example 8

A fine suspension copolymer containing 50 percent by weight of styrene and 50 percent by weight of methyl methacrylate was thoroughly mixed with 2 percent by weight of benzoyl peroxide. Two grams of this powder were mixed with 1 ml. of tetrahydropyran-2-yl-methyl methacrylate to which 0.5 percent by weight of N,N-dimethyl-p-toluidine had been added. The resulting slurry was very adhesive in character and polymerized to a hard material in about 5 minutes, with a considerable evolution of heat.

Example 9

A mixture of 60 percent by weight of cyclohexyl methacrylate and 40 percent by weight of tetrahydropyran-2-yl-methyl methacrylate was prepared and activated with 0.5 percent by weight of dimethyl-p-toluidine. One ml. of this monomer mixture was mixed with two grams of the copolymer of styrene and methyl methacrylate containing a 2 percent added benzoyl peroxide as described in Example 8. The resulting adhesive slurry polymerized in about five minutes.

Example 10

In accordance with the procedure set forth in Example 2, tetrahydropyran-2-methanol is reacted in substantially the same proportions as are shown in Example 2 with methyl acrylate whereby there is recovered the acrylate ester of tetrahydropyran-2-methanol.

The colorless liquid product is polymerized in accordance with the procedure of Example 3 to provide a hard brittle, acetone insoluble polymer in clear colorless form.

Similarly, the same procedure for the preparation as in Example 2 and polymerization as in Example 3 is successful to produce the liquid monomer and the solid transparent polymer of each of the tetrahydropyran-2-methanol esters, respectively, of alpha-chloroacrylic acid, alpha-bromoacrylic acid, and as a typical example of an alkylacrylate, alpha-ethylacrylic acid. Each of these liquid transparent monomers formed hard brittle acetone insoluble polymers by the method of Example 3.

The foregoing products have similar enhanced adhesive properties when copolymerized with monomeric methyl methacrylate, as set forth in Example 5, or when formulated as a monomerpolymer slurry with copolymers to produce interpolymerized products by the same procedure as set out in Examples 8 and 9.

In the foregoing examples, the adhesive character of the various copolymers and interpolymers of the tetrahydropyran-2-yl-methyl acrylates made in accordance with the invention, are far superior to the properties exhibited by methyl methacrylate polymers.

In a test against tooth enamel and gold using a plane area of ⅛ inch diameter, after 16 hours under water, the adhesion results were:

| Adhesive | Enamel, lbs. | Gold, lbs. |
|---|---|---|
| Methyl Methacrylate resin | 1-5 | 11-20 |
| T. H. P. M. (cured as in Example 3) | 6-10 | Over 20 |

In addition, the volumetric or linear contraction during polymerization of slurries (monomer-polymer slurries) containing the products of the invention is far less, about 60% of that exhibited by methyl methacrylate.

The water sorption can be made to be less than that exhibited by methyl methacrylate monomer-polymer slurries as in Example 8, or the water absorption can be made equal or more than methyl methacrylate by choice of monomer and polymer composition. This may be desirable to compensate for polymerization shrinkage. For example:

| Slurry Polymer | Percent Increase in Weight of Sample after— | | |
|---|---|---|---|
| | 1 Day | 20 Days | 130 Days |
| THPM+copolymer 496 | 1.00 | 1.43 | 2.04 |
| THPM+Poly. M. M. | 1.13 | 1.78 | 2.16 |
| THPM+Copolymer Amorphous A 201 | 1.34 | 2.95 | 5.4 |
| MM+Poly. M. M. | 1.00 | 2.20 | |

In the above table:

(1) Copolymer 496 is the copolymer prepared by the benzoyl peroxide catalyzed copolymerization of 47% of styrene, 3% methacrylic acid and 50% methyl methacrylate (parts by weight).

(2) THPM is the polymer of the compound prepared by the process of Example 3 and used as an adhesive between the stated surfaces.

(3) Poly. M. M. is the homopolymer of methyl methacrylate prepared by the polymerizing process as in Example 3.

(4) Amorphous A–201 is the copolymer prepared by the benzoyl peroxide catalyzed copolymerization of 15% styrene, 15% acrylonitrile.

(5) Under "slurry polymer" the first component is the monomer component, the second component is the bead or amorphous polymer component as in Example 8. The amount monomer to polymer in the slurry is in the ratio as in Example 8, two grams of polymer to 1 milliliter of monomer in the presence of the promoted catalyst of Example 8.

A further important advantage is the ability of the tetrahydropyran-2-yl-methyl acrylates to dissolve polymers which are ordinarily insoluble in higher alkyl methacrylates and to make compatible monomeric components which ordinarily are not compatible. For example, normal hexylmethacrylate monomer which ordinarily does not polymerize well with polymerized methyl methacrylate in a room temperature autocatalytic peroxide amine promoted system, is effectively and rapidly polymerized when about 5–100%, preferably 20–100%, based on the monomer present of the tetrahydropyranyl-2-yl-methyl esters of the present invention are added.

The above advantages are of particular utility in the production of dental restorations, such restorations including dentures, manufactured or repaired which are made wholly or partly with the polymers of tetrahydropyran-2-yl methyl esters, dental prosthetic structures containing said aforementioned polymers and the parts of which may embody adhesives based upon said aforementioned polymers in accordance with the invention.

Having thus disclosed the invention, what is claimed is:
1. As a new composition of matter, a polymerizable tetrahydropyran-2-yl-methyl acrylate having the general formula

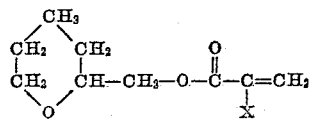

where X is a member of the group consisting of chlorine, bromine, lower alkyl and hydrogen.

2. The polymerizable ester of alpha-methacrylic acid and tetrahydropyran-2-methanol.

3. The polymerizable ester of acrylic acid and tetrahydropyran-2-methanol.

4. The polymerizable ester of alpha chloro acrylic acid and tetrahydropyran-2-methanol.

5. As a new composition of matter, a polymer of a tetrahydropyran-2-yl-methyl acrylate, said acrylate having the general formula

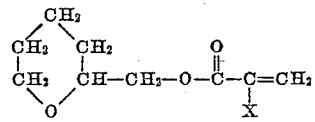

where X is a member of the group consisting of chlorine, bromine, lower alkyl and hydrogen.

6. A transparent resin comprising a polymer of tetrahydropyran-2-yl-methyl methacrylate.

7. A transparent resin comprising a polymer of tetrahydropyran-2-yl-methyl alpha chloro-acrylate.

8. A transparent resin comprising a polymer of tetrahydropyran-2-yl-methyl acrylate.

9. A solid polymer composition prepared by polymerizing tetrahydropyran-2-yl-methyl methacrylate monomer in the presence of a copolymer of methyl methacrylate and styrene and a free radical polymerization catalyst.

10. A solid polymer composition prepared by polymerizing tetrahydropyran-2-yl-methyl methacrylate monomer in the presence of a copolymer of methyl methacrylate, styrene and acrylic acid and a free radical polymerization catalyst.

11. A solid polymer composition prepared by polymerizing tetrahydropyran-2-yl-methyl methacrylate monomer in the presence of a copolymer of methyl methacrylate, styrene, acrylonitrile and acrylic acid and a free radical polymerization catalyst.

12. A dental restoration comprising the polymer composition as claimed in claim 6.

13. A dental restoration comprising the polymer composition as claimed in claim 9.

14. A dental restoration comprising the polymer composition as claimed in claim 10.

15. A dental restoration comprising the polymer composition as claimed in claim 11.

References Cited in the file of this patent
UNITED STATES PATENTS

| | | |
|---|---|---|
| 2,129,666 | Barrett et al. | Sept. 13, 1938 |
| 2,229,997 | Claborn | Jan. 28, 1941 |
| 2,537,921 | Smith | Jan. 9, 1951 |

OTHER REFERENCES

Lal et al.: Journal Organic Chem. August 1955, pages 1030–1033, especially page 1031.

Societe, Chemical Abstracts, volume 43, page 1435 (1949).

Hall: Journal Chemical Soc. 1953, pages 1398–1402; Chemical Abstracts 1954, page 3354.